US012027856B2

(12) United States Patent
Gopalakrishnan et al.

(10) Patent No.: US 12,027,856 B2
(45) Date of Patent: Jul. 2, 2024

(54) CONTROL SYSTEMS AND METHODS FOR MINIMIZING POWER LOSS ASSOCIATED WITH FUEL CELL SYSTEMS

(71) Applicant: BLOOM ENERGY CORPORATION, San Jose, CA (US)

(72) Inventors: Vishal Anand Aisur Gopalakrishnan, San Jose, CA (US); Ranganathan Gurunathan, San Jose, CA (US); Badrinarayanan Thiruvengadasamy, San Jose, CA (US); Subhash Chander Deswal, San Jose, CA (US); Rudrayya S. Math, San Jose, CA (US); Anbarasu Dorai, San Jose, CA (US); Pavankumar Dixit, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/340,877

(22) Filed: Jun. 25, 2023

(65) Prior Publication Data

US 2023/0420936 A1 Dec. 28, 2023

(51) Int. Cl.
 *H02J 3/00* (2006.01)
(52) U.S. Cl.
 CPC ...................... *H02J 3/00* (2013.01)
(58) Field of Classification Search
 CPC ............................ H02J 3/00; H02J 2300/30
 See application file for complete search history.

(56) References Cited

U.S. PATENT DOCUMENTS

| | | | |
|---|---|---|---|
| 9,059,636 B2 | 6/2015 | Lehn et al. | |
| 10,840,735 B1* | 11/2020 | Cooper | H02J 3/32 |
| 10,873,099 B1* | 12/2020 | Gurunathan | H01M 8/04604 |
| 2012/0326516 A1* | 12/2012 | Gurunathan | H02J 3/381 |
| | | | 307/43 |
| 2017/0187190 A1* | 6/2017 | Asano | H02J 1/102 |
| 2017/0358929 A1* | 12/2017 | Koeppe | H02J 1/08 |
| 2022/0399722 A1* | 12/2022 | Dennis | H02J 3/32 |

FOREIGN PATENT DOCUMENTS

EP 23427978 B1 7/2011

OTHER PUBLICATIONS

A Modular Grid-Connected Photovoltaic Generation System Based on DC Bus, Li Zhang; Kai Sun; Yan Xing; Lanlan Feng; Hongjuan Ge, Feb. 2011, vol. 26 pp. 523-531, China.

* cited by examiner

*Primary Examiner* — Daniel Cavallari
(74) *Attorney, Agent, or Firm* — Evergreen Valley Law Group; Kanika Radhakrishnan

(57) ABSTRACT

Embodiments of the present disclosure provide control systems and methods to reduce wastage of energy associated with fuel cell systems. The method includes transmitting DC power from a plurality of fuel cells of a set of power modules to a centralized DC bus through a first set of DC-DC converters. The method includes operating a second set of DC-DC converters to provide an output DC power by boosting a voltage level of the DC power from the centralized DC bus and further operating a first set of DC-AC inverters to convert the DC power from the second set of DC-DC converters to AC power. The method includes transmitting the AC power from the first set of DC-AC inverters to a grid. The AC power is transmitted to the grid at substantially unity power factor due to combined effect of switching modulation and MPPT of the first set of DC-AC inverters.

12 Claims, 7 Drawing Sheets

CONTROL SYSTEMS AND METHODS FOR MINIMIZING POWER LOSS ASSOCIATED WITH FUEL CELL SYSTEMS

TECHNICAL FIELD

The present disclosure relates to control systems and methods to reduce wastage of energy (or minimize power loss) associated with fuel cell systems and maintain uninterrupted operation of the fuel cell systems during testing and characterization of the fuel cell systems.

BACKGROUND

Electrical power systems are used for providing electrical power supply to one or more loads (e.g., appliances, factory equipment, power storage units, buildings, etc.). The electricity used to power the loads is often received from an electrical grid. However, alternative power sources (e.g., electrochemical devices) can also be used in conjunction with the electrical grid or independently to provide power supply to the loads.

One such example of the electrochemical devices used as an alternative power source is fuel cell systems. In general, the fuel cells convert chemical energy stored in fuels to electrical energy (i.e. direct current (DC) supply) with a higher efficiency rate. As a result, conversion of the electrical energy (i.e. DC supply) to alternating current (AC) supply and synchronization are required for providing the electrical power supply to the electrical grid and/or the loads. In one case, the fuel cell systems are continuously operated (i.e. 24 hours throughout the year) for providing electrical power supply to the electrical grid while various tests are being performed on the fuel cells systems. In traditional methods, an electronic load may be utilized to dissipate the power generated by the fuel cell systems for the purpose of testing. However, such traditional methods lead to power loss in case of any grid events (such as grid failure), as there will be no alternative path for dissipating the power generated by the fuel cell systems. In addition, such traditional methods lead to excessive heat dissipation from the power sources (i.e. the fuel cells) during grid failure. Thus, cooling equipment is installed at the generation site to remove the dissipated heat, which inherently leads to an increase in operational cost.

Further, to maintain proper operating conditions of the fuel cell systems during power generation and testing, it is desirable to continually monitor the parameters of the fuel cell systems and the grid events. However, current methods employ a manual process (i.e. human intervention) for monitoring the parameters of the fuel cell systems and the grid events. As a result, optimizing the operating condition of the fuel cell systems based on the manual process involved in monitoring the fuel cell systems and the grid events is inefficient or difficult.

Therefore, there is a need for a control system architecture to reduce wastage of energy while maintaining the uninterrupted operation of the electrochemical devices (i.e. the fuel cell systems) during power generation and testing, in addition to providing other technical advantages.

SUMMARY

Various embodiments of the present disclosure provide control systems and methods to reduce wastage of energy (or minimize power loss) associated with fuel cell systems and maintain uninterrupted operation during testing and characterization of the fuel cell systems.

In an embodiment, a system is disclosed. The system includes a set of power modules. Each power module of the set of power modules includes a plurality of fuel cells configured to generate direct current (DC) power. The system includes a first set of direct current-to-direct current (DC-DC) converters. Each of the first set of DC-DC converters includes an input terminal and an output terminal. Further, each DC-DC converter of the first set of DC-DC converters is electrically connected to a corresponding power module of the set of power modules at the input terminal. The system includes a centralized DC bus formed by an interconnection of the output terminal of each of the first set of DC-DC converters. Further, the system includes a second set of DC-DC converters electrically connected to the centralized DC bus. The second set of DC-DC converters is configured to provide an output DC power by boosting a voltage level of the DC power received from the set of power modules through the first set of DC-DC converters and the centralized DC bus. The system further includes a first set of direct current-to-alternating current (DC-AC) inverters. Each of the first set of DC-AC inverters includes a DC end and an AC end. The first set of DC-AC inverters is electrically connected to the second set of DC-DC converters at the DC end and the AC end is electrically connected to a grid. The system further includes a control unit communicably coupled to the first set of DC-AC inverters and the grid. The control unit is configured to at least operate the first set of DC-AC inverters to convert the DC power output from the second set of DC-DC converters to AC power. The control unit is configured to facilitate the transmission of the AC power output of the first set of DC-AC inverters to the grid based at least on determining one or more parameters associated with the grid are within a threshold limit. The first set of DC-AC inverters enables transmission of the AC power to the grid at a substantially unity power factor.

In another embodiment, a method for minimizing power loss associated with a set of power modules is disclosed. The method includes transmitting direct current (DC) power generated by a plurality of fuel cells associated with each power module of the set of power modules to a centralized DC bus through a first set of direct current-to-direct current (DC-DC) converters. The method includes operating a second set of DC-DC converters electrically coupled to the centralized DC bus to provide an output DC power by boosting a voltage level of the DC power received from the centralized DC bus. Further, the method includes operating a first set of direct current-to-alternating current (DC-AC) inverters to convert the DC power received from the second set of DC-DC converters through a DC split bus to AC power based, at least in part, on maximum power point tracking (MPPT). The method further includes facilitating transmission of the AC power output from the first set of DC-AC inverters to a grid based at least on determining one or more parameters associated with the grid are within a threshold limit. The AC power is transmitted to the grid from the first set of DC-AC inverters at a substantially unity power factor due to the combined effect of switching modulation and MPPT of the first set of DC-AC inverters.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1A:
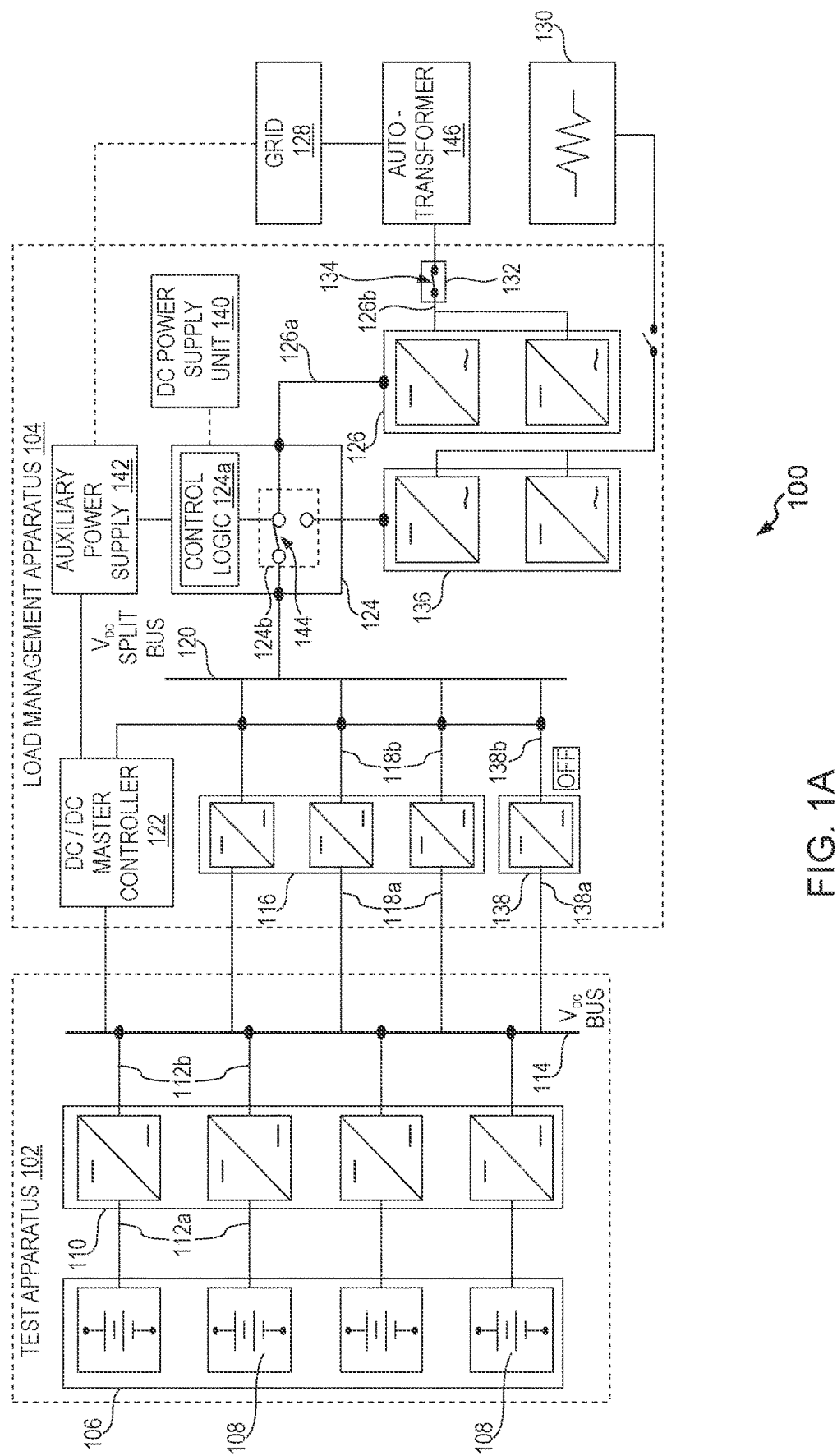
FIG. 1A is a block diagram representation of a control system architecture to conserve energy associated with power modules, in accordance with an embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various examples of the present disclosure provide control systems and methods to reduce wastage of energy (or minimize power loss) associated with fuel cell systems and maintain uninterrupted operation of the fuel cell systems during testing and characterization operations. The system includes a set of power modules. Each power module of the set of power modules includes a plurality of fuel cells configured to generate direct current (DC) power. The system includes a first set of direct current-to-direct current (DC-DC) converters. Each DC-DC converter of the first set of DC-DC converters includes an input terminal and an output terminal. Further, each DC-DC converter of the first set of DC-DC converters is electrically connected to a corresponding power module of the set of power modules at the input terminal. The output terminal of each of the first set of DC-DC converters is interconnected with each other to create a centralized DC bus. The first set of DC-DC converters is operated for conditioning the DC power generated by the plurality of fuel cells associated with each power module of the set of power modules based, at least in part, on input current control operation. Thereafter, the first set of DC-DC converters transmits the DC power output to the centralized DC bus upon conditioning.

Further, the system includes a second set of DC-DC converters electrically connected to the centralized DC bus. The second set of DC-DC converters is operated based on the receipt of command signals from a DC-DC master controller. Upon receipt of the command signals, the second set of DC-DC converters is configured to provide an output DC power by boosting a voltage level of the DC power received from the set of power modules through the first set of DC-DC converters and the centralized DC bus. Further, an output end of each of the second set of DC-DC converters is electrically coupled to each other to create a DC split bus. The DC split bus is configured to receive the DC power output from the second set of DC-DC converters. Further, the system includes a first set of direct current-to-alternating current (DC-AC) inverters. Each of the first set of DC-AC inverters includes a DC end and an AC end. The first set of DC-AC inverters is electrically connected to the second set of DC-DC converters at the DC end and the AC end is electrically connected to a grid. Furthermore, a control unit is communicably coupled to the first set of DC-AC inverters and the grid. The control unit is configured to operate the first set of DC-AC inverters to convert the DC power output from the second set of DC-DC converters to AC power as per the grid requirements based at least on maximum power point tracking (MPPT). Thereafter, the control unit facilitates transmission of the AC power output from the first set of DC-AC inverters to the grid based at least on determining one or more parameters associated with the grid are within a threshold limit. The AC power is transmitted to the grid from the first set of DC-AC inverters at a substantially unity power factor due to the combined effect of switching modulation and MPPT of the first set of DC-AC inverters. This results in maximum power transmission efficiency from the set of power modules to the grid.

In one embodiment, the control unit determines a power outage condition of the grid based at least on monitoring the one or more parameters associated with the grid. In this scenario, the control unit operates a changeover switch to a second position from a first position for disconnecting the first set of DC-AC inverters from the DC split bus during a power outage condition of the grid. Further, the changeover switch operated in the second position enables an electrical connection between a second set of DC-AC inverters and the DC split bus. The second set of DC-AC inverters converts the DC power received from the second set of DC-DC converters through the DC split bus to AC power. Thereafter, the AC power output from the second set of DC-AC inverters is transmitted to a load by operating a second switch in a closed state. Thus, transmitting the AC power output from the second set of DC-AC inverters to the load during the power outage condition of the grid ensures that the plurality of fuel cells of the set of power modules is uninterrupted during testing and characterization of the plurality of fuel cells. In some embodiments, the DC-DC master controller is configured to selectively operate at least one DC converter of a third set of DC-DC converters along with the second set of DC-DC converters based on determining a failure condition of at least one DC-DC converter of the second set of DC-DC converters.

Various example embodiments of the present disclosure are described hereinafter with reference to FIGS. 1A-1D to FIG. 4.

FIG. 1A is a block diagram representation of a control system architecture 100 to conserve energy associated with power modules, in accordance with an embodiment of the present disclosure. As shown, the control system architecture 100 (hereinafter interchangeably referred to as 'the system 100') includes a test apparatus 102 and a load management apparatus 104. The test apparatus 102 includes a set of power modules 106 (exemplarily depicted to be four power modules). The set of power modules 106 (hereinafter interchangeably referred to as 'the power modules 106') is configured to generate power. In one example, the power modules 106 may include electrochemical devices, such as a plurality of fuel cells 108.

In an embodiment, each power module 106 may be configured with a cabinet or housing to house one or more miniaturized hot boxes (not shown in figures). Further, each miniaturized hot box is configured to house one or more stacks or columns of fuel cells, such as the fuel cells 108. Some non-limiting examples of the fuel cells 108 may include solid oxide fuel cells having a ceramic oxide electrolyte, polymer electrolyte membrane (PEM), molten carbonate, phosphoric acid, and the like. The fuel cells 108 are often grouped into units and/or stacks (referred to as fuel cell stacks) in which the fuel cells 108 are electrically connected in series and separated by electrically conductive interconnects (not shown in figures). For example, the conductive interconnects may be gas separator plates. The fuel cell stack may include conductive end plates on its ends.

The fuel cell stacks (or the fuel cells 108) may be internally manifolded for fuel and externally manifolded for air, where only the fuel inlet and exhaust risers extend through openings in the layers of the fuel cells 108 and/or in the conductive interconnects between the fuel cells 108. In an embodiment, the fuel cells 108 may have a cross-flow configuration where air and fuel flow roughly perpendicular to each other on opposite sides of the electrolyte in each of the fuel cells 108. In another embodiment, the fuel cells 108 may be configured with a counter-flow parallel configuration, where air and fuel flow roughly parallel to each other but in opposite directions on opposite sides of the electrolyte in each of the fuel cells 108. In another embodiment, the fuel cells 108 may be configured with a co-flow parallel configuration, where air and fuel flow roughly parallel to each other in the same direction on opposite sides of the electrolyte in each fuel cell 108.

Moreover, the fuel cells 108 of each of the power modules 106 include anode and cathode electrodes (not shown in figures). The fuel cells 108 convert the energy stored in the fuels to electricity (i.e. DC power) by a chemical reaction that takes place at the electrodes (i.e. anode and cathode). In other words, the fuel cells 108 generate electricity in the form of direct current (DC) by a chemical reaction. Further, each power module 106 including the fuel cells 108 may contain electrical leads for transmitting direct current (DC) from each of the power modules 106 to a power conditioning system which will be explained further in detail.

The test apparatus 102 further includes one or more power conditioning components (or power converters), such as a first set of direct current-to-direct current (DC-DC) converters 110 (exemplarily depicted to be four DC-DC converters). As shown, each DC-DC converter of the first set of DC-DC converters 110 is electrically connected to a corresponding power module of the power modules 106. More specifically, each of the DC-DC converters 110 includes an input terminal 112a and an output terminal 112b. Further, each of the DC-DC converters 110 is electrically connected to a corresponding power module of the set of power modules 106 at the input terminal 112a.

The power conditioning components (i.e. the first set of DC-DC converters 110) are designed to convert DC power from the fuel cells 108 to different DC voltages. In particular, the DC-DC converter, such as the DC-DC converters 110 takes the current and passes it through a switching element associated with the DC-DC converter which in turn converts the signal into a square wave (or alternating current (AC) signal). Further, the DC-DC converters 110 include filters for converting the square wave (or the AC signal) back to the DC signal of the required voltage level.

More specifically, the DC-DC converters 110 are operated for conditioning the DC power received from the power modules 106. Normally, the power generated by the fuel cells 108 may be of low-voltage level. Thus, the DC-DC converters 110 are used to boost the low-voltage DC output of the power modules 106 into a high-voltage DC output. For example, the test apparatus 102 is required to provide an output of 170 volts DC, but the total DC voltage generated from the power modules 106 may be 90 volts DC. In this scenario, the DC-DC converters 110 electrically connected to the power modules 106 are configured to boost the low-voltage output (90 volts DC) of the power modules 106 to the required DC output (or 170 volts DC). It is evident that the DC-DC converters 110 in the test apparatus 102 prevent the usage of additional power modules for generating the required output voltage in the test apparatus 102. Further, the number of power modules 106 and the DC-DC converters 110 are exemplary, and they can be any number based on the DC power output of the test apparatus 102 and/or power requirements of a grid (see, 128).

Further, the output terminal 112b of each of the DC-DC converters 110 is interconnected to form a centralized DC bus 114 (represented as '$V_{DC}$-BUS'). As such, the DC power output from each of the DC-DC converters 110 is received at the centralized DC bus 114. For example, 170 volts DC output generated due to operation of the DC-DC converters 110 and the fuel cells 108 of the power modules 106 is fed to the centralized DC bus 114. Further, in order to maintain the required DC output associated with the test apparatus 102, the DC-DC converters 110 are operated based on input current control operation and uninterrupted fuel flow into the fuel cells 108. In other words, by operating the DC-DC converters 110 in input current control and the fuel flow into the fuel cells 108, it is possible to load the required DC output uniformly to the centralized DC bus 114 and simulate the conditions of operations in the test apparatus 102.

The load management apparatus 104 includes a second set of DC-DC converters 116 (exemplarily depicted to be three DC-DC converters). Similar to the first set of DC-DC converters 110, the second set of DC-DC converters 116 includes an input end 118a and an output end 118b. As shown, the input end 118a of each of the second set of DC-DC converters 116 is electrically connected to the centralized DC bus 114. The output end 118b of each of the second set of DC-DC converters 116 (hereinafter interchangeably referred to as 'the DC-DC converters 116) is electrically coupled to each other to form a DC split bus 120 (represented as '$V_{DC}$SPLIT BUS').

Further, the load management apparatus 104 includes a DC-DC master controller 122. The DC-DC master controller 122 is communicably coupled to the second set of DC-DC converters 116. More specifically, the DC-DC master controller 122 commands the DC-DC converters 116 to operate for conditioning the DC power as per the power requirements of the grid (see, 128). The DC-DC converters 116 are configured to operate similar to the first set of DC-DC converters 110. More specifically, the second set of DC-DC converters 116 provides an output DC power by boosting the voltage level of the DC power received from the first set of DC-DC converters 110 via the centralized DC bus 114. The DC-DC master controller 122 operates the DC-DC converters 116 to boost the voltage level of the DC power output from the centralized DC bus 114 based at least on an input current control operation. As explained above, the DC power output of the DC-DC converters 110 fed into the centralized DC bus 114 is 170 volts DC. In one example, the required voltage of the grid 128 may be 415 volts AC. In this scenario, the DC-DC converters 116 are operated to step-up the voltage level of the DC power (i.e. 170 volts DC) received from the DC-DC converters 110 via the centralized DC bus 114 to a voltage level of 390 volts DC (approximately nearer to the power requirements of the grid 128). It will be apparent that the DC-DC master controller 122 operates the DC-DC converters 116 such that the output voltage of 390 volts DC is maintained. Thereafter, the DC power output from the second set of DC-DC converters 116 is fed into the DC split bus 120. In other words, the second set of DC-DC converters 116 steps up the voltage from +170 volts DC (i.e. voltage of the output DC power from the centralized DC bus 114) to +/−390 volts DC, which is fed to the DC split bus 120.

Furthermore, the load management apparatus 104 includes a control unit 124. The control unit 124 includes a control logic 124a (or a processor) and a changeover switch 124b. In an embodiment, the control logic 124a may be a logic circuit or a controller device (such as an inverter redundant controller (IRC)). In another embodiment, the control logic 124a may be provided with inputs from a master computer (not shown in figures) for operating one or more components of the system 100. Further, the master computer may be utilized to validate the performance of each of the components in the system 100. The changeover switch 124b may be an electrical switch (e.g., a switching circuit or an electromechanical switch, such as a relay). The control unit 124 including the control logic 124a determines whether to route the power to the grid 128 or a load 130 in order to maintain uninterrupted operation of the fuel cells 108 during testing and characterization of the fuel cells 108.

The control unit 124 is communicably coupled to a first set of DC-AC inverters 126 (exemplarily depicted to be two DC-AC inverters). The first set of DC-AC inverters 126 (hereinafter interchangeably referred to as 'the DC-AC inverters 126') includes a DC end 126a and an AC end 126b. The control logic 124a facilitates an electrical connection of the first set of DC-AC inverters 126 with the DC split bus 120 at the DC end 126a by operating the changeover switch 124b. Further, the first set of DC-AC inverters 126 is electrically connected to the grid 128 at the AC end 126b via a first switch 132 (e.g., miniature circuit breaker (MCB)). The first set of DC-AC inverters 126 may be connected to the grid 128 via an auto-transformer (see, 146).

The control logic 124a provides command signals to the first set of DC-AC inverters 126 to control the operation (i.e. turn ON/OFF) of the DC-AC inverters 126. More specifically, the control unit 124 including the control logic 124a is configured to monitor one or more parameters associated with the grid 128. The one or more parameters include voltage amplitude, phase angle, and frequency. The control logic 124a operates the changeover switch 124b in a first position 144 (as shown in FIG. 1A) based at least on determining the one or more parameters of the grid 128 are within a threshold limit. The threshold limit of the grid 128 corresponds to the safe and/or steady-state operating condition of the grid 128. Thereafter, the control logic 124a provides a first command signal to the DC-AC inverters 126. Upon receipt of the first command signal, the DC-AC inverters 126 are operated to convert the DC power output from the DC split bus 120 to AC power suitable for injecting into the grid 128 (normally 120 V root mean square (RMS) at 60 Hz or 240 V RMS at 50 Hz).

Thereafter, the control logic 124a facilitates the DC-AC inverters 126 to transmit the AC power to the grid 128 based at least on the parameters associated with the grid 128. More specifically, the control logic 124a operates the DC-AC inverters 126 to synchronize their frequency with that of the grid 128 or limit it to not higher than that of the grid 128. Upon synchronizing the frequencies, the first switch 132 is operated in a closed position (see, 134 of FIG. 1A), thereby enabling power transmission (AC power) from the DC-AC inverters 126 to the grid 128 via the auto-transformer 146. In an embodiment, the DC-AC inverters 126 used for converting DC power to AC power, and transmitting the AC power output to the grid 128 may be grid-tie inverters.

Additionally, the control unit 124 including control logic 124a may be configured to operate the first set of DC-AC inverters 126 based, at least in part, on maximum power point tracking (MPPT). In particular, the control logic 124a is configured to constantly adjust the resistance at the input (or the DC end 126a) of the DC-AC inverters 126 for operating the DC-AC inverters 126 at MPPT. In other words, the control logic 124a operates the DC-AC inverters 126 based at least on the input current control operation. Further, the DC-AC inverters 126 is configured with switching modulation. The switching modulation controls turn ON/OFF of inverter switches (not shown in figures) under constant input DC voltage to achieve the required output voltage by the DC-AC inverters 126 in a controlled manner. Thus, it is evident that the switching modulation facilitates the DC-AC inverters 126 to operate at maximum efficiency. As a result, the combined effect of the switching modulation and the input current control of the DC-AC inverters 126, and operating the DC-AC inverters 126 based at least on MPPT, allows power transmission (AC power) from the DC-AC inverters 126 to the grid 128 at substantially unity power factor (p.f). This results in maximum power transmission efficiency from the power modules 106 to the grid 128. Further, transmitting the power from the power modules 106 to the grid 128 at a substantially unity power factor (or p.f. approximately nearer to 1 or equal to 1) results in reduced wastage of energy (or power losses). Thus, the power modules 106 are uninterrupted and operate in a steady-state condition during the tests being performed on the fuel cells 108 and hence, resulting in maximum power harvest from the power modules 106.

Further, the load management apparatus 104 includes a second set of DC-AC inverters 136 coupled to the control unit 124. The second set of DC-AC inverters 136 (hereinafter interchangeably referred to as 'the DC-AC inverters 136') is electrically connected to the load 130. The control logic 124a is configured to selectively operate the DC-AC inverters 126 and the DC-AC inverters 136 based at least on determining the operating conditions of the grid 128 which will be explained further in detail.

The load management apparatus 104 includes a third set of DC-DC converters 138. The third set of DC-DC converters 138 (hereinafter interchangeably referred to as 'the DC-DC converters 138) includes an input end 138a electrically connected to the centralized DC bus 114 and an output end 138b electrically connected to the DC split bus 120. The DC-DC master controller 122 selectively operates the DC-DC converters 116 and 138 for compensating the load demand. In addition, the DC-DC master controller 122 selectively operates at least one DC-DC converter of the third set of DC-DC converters 138 based at least on determining a failure condition of at least one DC-DC converter of the second set of DC-DC converters 116 which will be explained further in detail. It is to be noted that the DC-DC converters 138 are in the OFF state (as shown in FIG. 1A), as none of the DC-DC converters 116 in FIG. 1A experiences the failure condition.

The load management apparatus 104 further includes at least one power supply unit 140. For example, the power supply unit 140 is a DC power supply unit (or an energy storage device, such as a battery). The power supply unit 140 is configured to provide power supply to one or more communication modules and low voltage circuits associated with the system (i.e. the system 100). In an embodiment, the power supply unit 140 utilized in the system 100 may be of a low voltage capacity (e.g., 24 volts). The power supply unit 140 provides electrical supply (or DC supply) to one or more operating components of the control unit 124. The one or more operating components may include, but are not limited to, communication modules and low voltage circuits of the control unit 124. Additionally, the power supply unit 140 may provide an electrical power supply to the power converters (such as the DC-DC converters 116 and 138, the DC-AC inverters 126 and 136) and the DC-DC master controller 122. Further, the load management apparatus 104 includes an auxiliary power supply 142. For example, the auxiliary power supply 142 may be an uninterruptible power supply (UPS). The auxiliary power supply 142 may be configured to store energy by receiving power supply from the grid 128 (as shown in FIG. 1A). The auxiliary power supply 142 is configured to utilize the stored energy to provide power supply to the control unit 124 and the DC-DC master controller 122 during the grid 128 failure conditions.

Figure 1B:
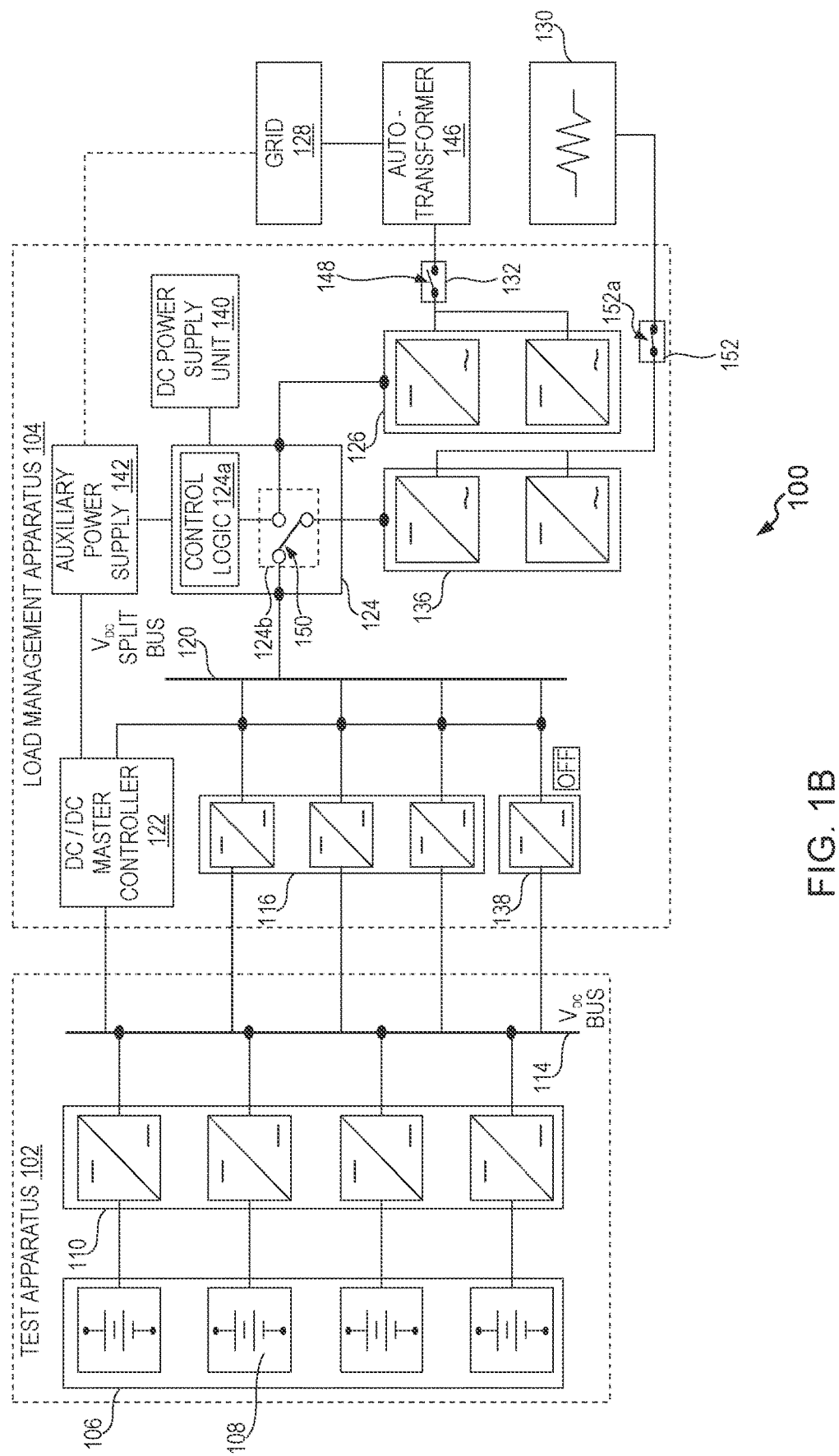
FIGS. 1B, 1C, and 1D represent the control system architecture of FIG. 1A in various modes of operation, in accordance with an embodiment of the present disclosure.

Referring to FIG. 1B, the control logic 124a is configured to determine the operating conditions of the grid 128 based at least on the parameters associated with the grid 128. In one scenario, the grid 128 may experience a power outage condition (or power failure, or blackout). The control logic 124a determines the power outage condition of the grid 128 based on monitoring the parameters (e.g., frequency, voltage amplitude, and phase) of the grid 128. In this scenario, the first switch 132 is operated in an open position (see, 148). Further, the control logic 124a transmits a second command signal to the first set of DC-AC inverters 126, for disconnecting the DC-AC inverters 126 from the grid 128. In other words, the second command signal from the control logic 124a will 'turn OFF' the first set of DC-AC inverters 126.

However, the power modules 106 are constantly operated and generate power that needs to be transmitted to a load in order to prevent power losses at the power modules 106. In this case, the control logic 124a operates the changeover switch 124b to a second position (see, 150), thereby facilitating a connection of the second set of DC-AC inverters 136 to the DC split bus 120. In other words, the control logic 124a routes the power from the DC split bus 120 to the DC-AC inverters 136 by operating the changeover switch 124b in the second position 150 in the event of power outage condition of the grid 128. Thereafter, the control logic 124a transmits the first command signal to the DC-AC inverters 136. The first command signal is similar to that of the first command signal being transmitted to the first set of DC-AC inverters 126. Upon receipt of the first command signal, the DC-AC inverters 136 are operated (or turn ON) to convert the DC power output from the DC split bus 120 to AC power. It is to be noted that the DC-AC inverters 136 may exhibit similar operation to that of the DC-AC inverters 126. Thus, the DC-AC inverters 136 convert the DC power (390 volts DC) from the DC split bus 120 to AC power as per the power requirements of the load 130. Thereafter, the DC-AC inverters 136 are configured to transmit the power to the load 130 due to the absence of the grid 128. It is to be noted that the AC power from the DC-AC inverters 136 is transmitted to the load 130 upon operating a second switch 152 (e.g., MCB) in a closed state (see, 152a of FIG. 1B). This ensures that the tests being performed in the test apparatus 102 do not incur interruptions during these events (i.e. power outage condition of the grid 128). In other words, transmitting the power to the load 130 by operating the DC-AC inverters 136 in power outage condition of the grid 128 ensures that the fuel cells 108 of the power modules 106 are uninterrupted during the testing and characterization of the fuel cells 108.

Further, upon determining the availability of the grid 128, the control logic 124a operates the second switch 152 and the changeover switch 124b in an open state (see, 152b of FIG. 1C) and in the first position 144, respectively. Thus, operating the changeover switch 124b in the first position 144 disconnects the second set of DC-AC inverters 136 from the DC split bus 120 and connects the first set of DC-AC inverters 126 to the DC split bus 120.

Figure 1C:
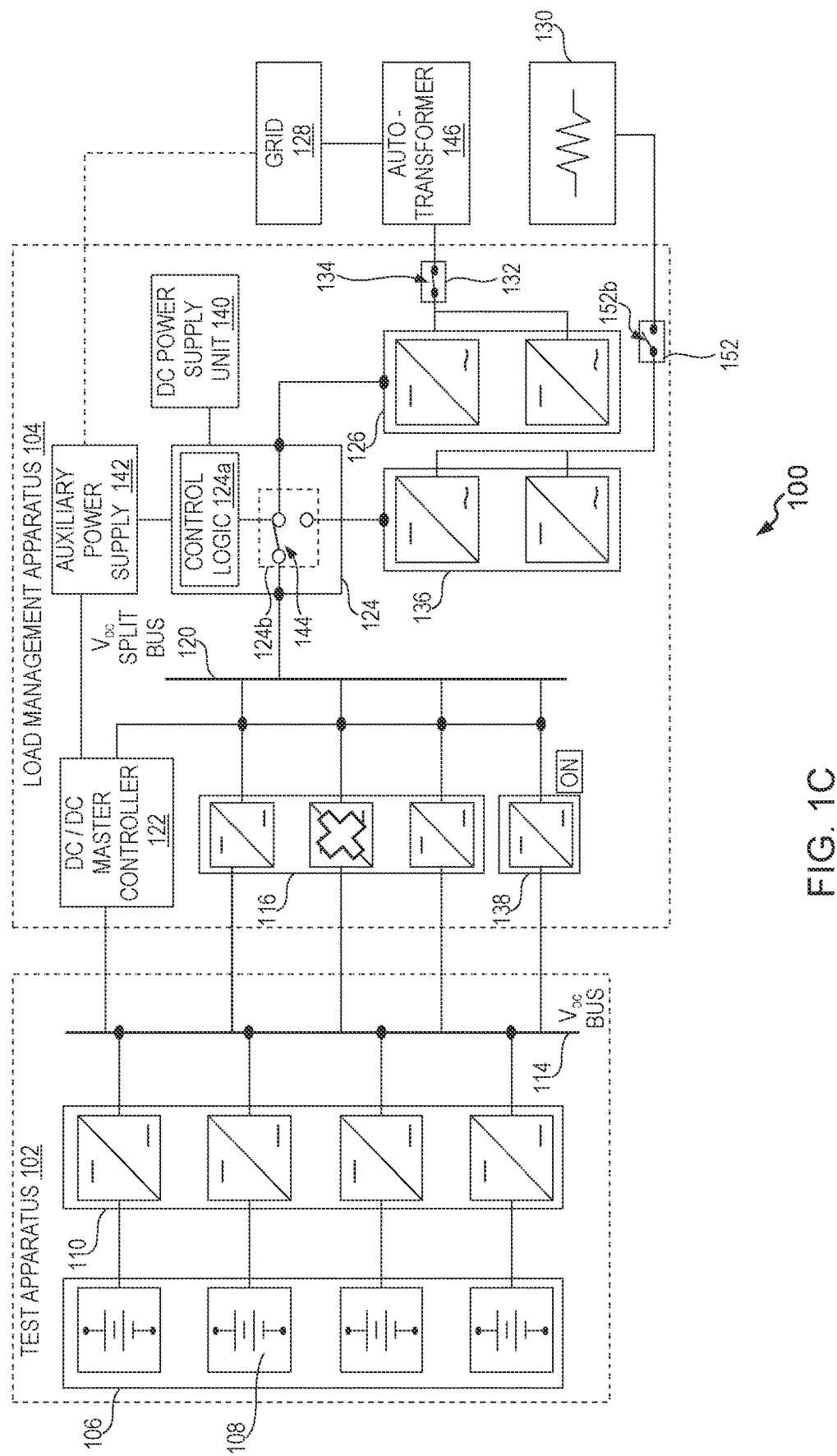

Referring to FIG. 1C, the DC-DC master controller 122 selectively operates the second and third set of DC-DC converters 116 and 138 based at least on input current control operation in order to maintain the required DC power output at the DC split bus 120. In one scenario, at least one DC-DC converter of the DC-DC converters 116 may experience a failure (i.e. failure condition). For illustrative purposes, the failure condition of the DC-DC converter is represented by 'X' notation. In this scenario, the DC-DC master controller 122 is configured to operate at least one DC-DC converter of the DC-DC converters 138 along with the DC-DC converters 116 based at least on determining failure of the at least one DC-DC converter of the DC-DC converters 116. Thus, the DC power output from the centralized DC bus 114 is routed to the second set of DC-DC converters 116 and the at least one DC-DC converter of the third set of DC-DC converters 138. The DC-DC converters 116 and 138 are operated for conditioning the DC power output from the centralized DC bus 114 in order to maintain the required DC power output at the DC split bus 120. For example, one DC-DC converter of the second set of DC-DC converters 116 may experience failure. To that effect, the DC-DC master controller 122 operates one DC-DC converter of the third set of DC-DC converters 138 for maintaining the required output voltage of 390 volts (or required DC power output) at the DC split bus 120. Thereafter, the DC power output from the DC split bus 120 is transmitted to either the grid 128 or the load 130 through the DC-AC inverters 126 or the DC-AC inverters 136, respectively, based on an operation of the changeover switch 124b. Further, transmitting the AC power through either of the DC-AC inverters 126 or 136 is explained in detail with reference to FIGS. 1A and 1B, and therefore, it is not reiterated herein for the sake of brevity.

Figure 1D:
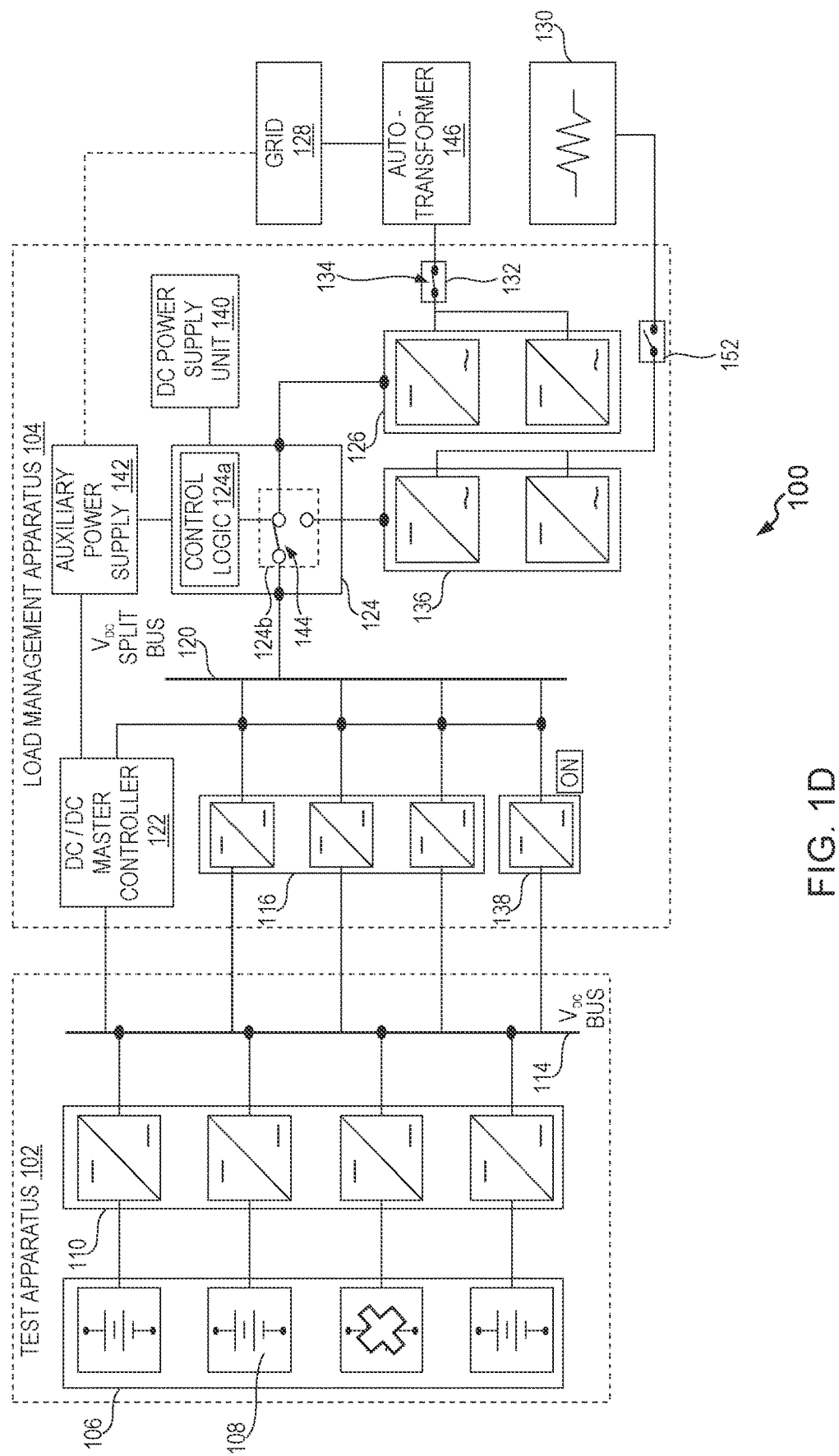

Referring to FIG. 1D, the test apparatus 102 may not be able to generate the required power output due to failure of one or more power modules (i.e. the power modules 106) or low operating efficiency of at least one DC-DC converter of the DC-DC converters 110 or the like. For instance, the test apparatus 102 may include four power modules (i.e. the power modules 106) among which one power module may experience failure. As a result, the test apparatus 102 outputs 130 volts DC (which is less than the required output voltage (170 volts)) due to the operation of only three power modules. For illustrative purposes, the failure condition of the power module is represented by 'X' notation. In this scenario, the DC-DC master controller 122 operates the DC-DC converters 138 along with the DC-DC converters 116 in order to compensate for the load demand (or to maintain the required output of 390 volts at the DC split bus 120). Similarly, the DC-DC master controller 122 performs similar operations in case of low operating efficiency of the DC-DC converters 110, and therefore, they are not explained herein for the sake of brevity.

The number and arrangement of the one or more components shown in FIGS. 1A-1D are provided as an example. There may be additional components systems, devices, modules and/or fewer systems, devices; different systems, devices; and/or differently arranged systems, devices than those shown in FIGS. 1A-1D. Furthermore, two or more components or devices shown in FIGS. 1A-1D may be implemented within a single system or device, or a single system or device shown in FIGS. 1A-1D may be implemented as multiple, distributed systems or devices.

Figure 2:
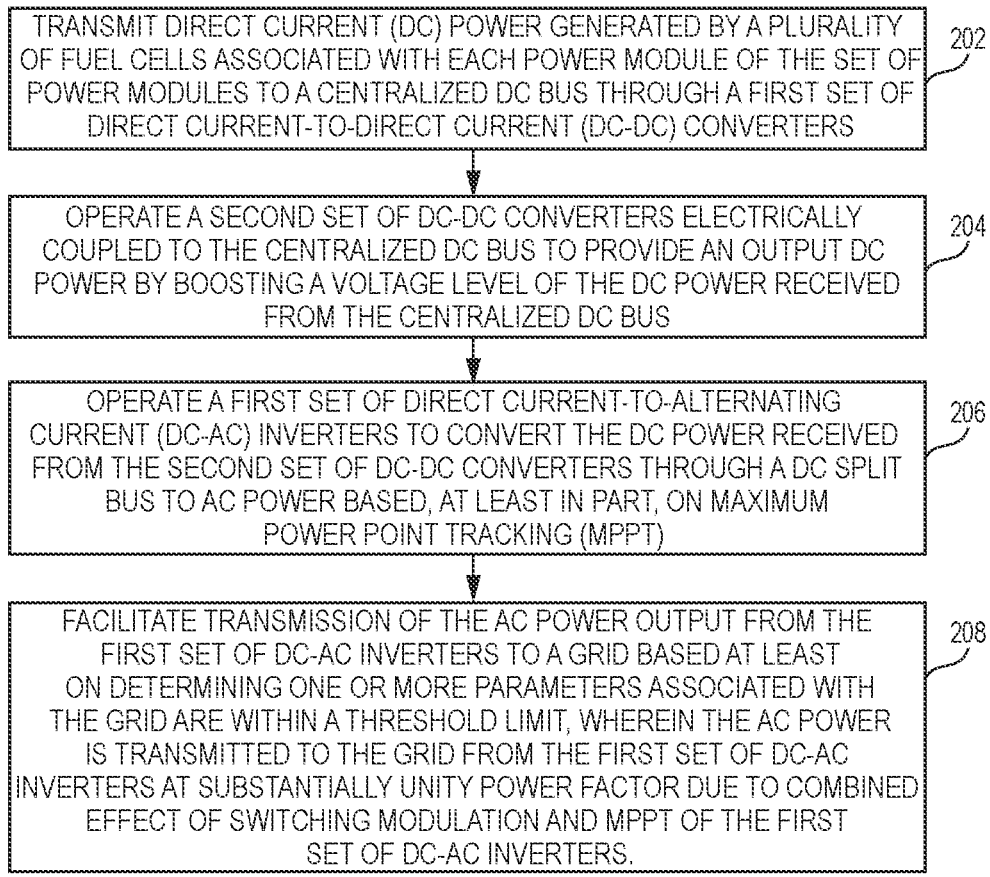
FIG. 2 represents a flow diagram of a method for minimizing power loss associated with the power modules and maintaining the uninterrupted operation of the power modules during testing and characterization operations, in accordance with an embodiment of the present disclosure.

FIG. 2 represents a flow diagram of a method 200 for minimizing power loss associated with the set of power modules 106 and maintaining the uninterrupted operation of the power modules 106 during the testing and characterization process, in accordance with an embodiment of the present disclosure. The sequence of operations of the method 200 may not be necessarily executed in the same order as they are presented. Further, one or more operations may be grouped and performed in the form of a single step, or one operation may have several sub-steps that may be performed in parallel or a sequential manner.

At operation 202, the method 200 includes transmitting DC power generated by a plurality of fuel cells 108 associated with each power module of the set of power modules 106 to a centralized DC bus 114 through a first set of DC-DC converters 110. As explained above, each power module includes the fuel cells 108 that are configured to generate the DC power. The DC power output of the power modules 106 may be of a low voltage level. Thus, the first set of DC-DC converters 110 is used for conditioning the power output from the power modules 106, prior to injecting into the centralized DC bus 114. More specifically, the DC-DC converters 110 are configured to boost the voltage level based on the required power output (or defined voltage level e.g., 170 volts) associated with the test apparatus 102. Thereafter, the DC power output from the DC-DC converters 110 is fed to the centralized DC bus 114.

At operation 204, the method 200 includes operating a second set of DC-DC converters 116 electrically coupled to the centralized DC bus 114 to provide an output DC power by boosting a voltage level of the DC power received from the centralized DC bus 114. More specifically, the DC-DC converters 116 may be operated to boost the voltage level of the DC power received from the centralized DC bus 114 based at least on the power requirements of the grid 128 and/or the required DC power output at the DC split bus 120.

At operation 206, the method 200 includes operating a first set of direct current-to-alternating current (DC-AC) inverters 126 to convert the DC power received from the second set of DC-DC converters 116 through a DC split bus 120 to AC power based, at least in part, on maximum power point tracking (MPPT). The control logic 124a is configured to determine the maximum power point (MPP) for operating the DC-AC inverters 126. As such, the control logic 124a constantly adjusts the resistance at the DC end 126a of the DC-AC inverters 126 for operating the DC-AC inverters 126 at MPPT. Thus, operating the DC-AC inverters 126 based at least on MPPT facilitates the conversion of the DC power output from the DC split bus 120 to AC power at a substantially unity power factor (p.f).

At operation 208, the method 200 includes facilitating transmission of the AC power output from the first set of DC-AC inverters 126 to the grid 128 based at least on determining one or more parameters associated with the grid 128 are within a threshold limit. The control logic 124a is configured to determine whether the parameters associated with the grid 128 are within a threshold limit. In other words, the control logic 124a operates the DC-AC inverters 126 to synchronize their frequency with that of the grid 128. Upon synchronizing the frequencies, the first switch 132 is operated in the closed position 134 which in turn facilitates transmission of the AC power from the DC-AC inverters 126 to the grid 128. It is to be noted that the AC power is transmitted to the grid 128 from the first set of DC-AC inverters 126 at a substantially unity power factor (p.f) due to the combined effect of the switching modulation and MPPT of the first set of DC-AC inverters 126. Thus, transmitting the AC power output from the power modules 106 to the grid 128 at a substantially unity power factor results in maximum power transmission efficiency from the power modules 106 to the grid 128. Thus, it is evident that the power modules 106 are uninterrupted and operate in the steady state condition while the testing and characterization operations are being performed on the fuel cells 108.

Additionally, the control logic 124a operates the second set of DC-AC inverters 136 to convert the DC power received from the second set of DC-DC converters 116 through the DC split bus 120 to AC power, in case of power outage condition of the grid 128. In this scenario, the control unit 124 including the control logic 124a operates the changeover switch 124b to the second position 150 from the first position 144 for disconnecting the DC-AC inverters 126 from the DC split bus 120. Further, operating the changeover switch 124b to the second position 150 enables electrical connection between the DC split bus 120 and the DC-AC inverters 136, thereby allowing the DC-AC inverters 136 to convert the DC power output from the DC split bus 120 to AC power. Thereafter, the AC power output from the DC-AC inverters 136 is transmitted to the load 130 during grid failure conditions. It is to be noted that, transmitting the AC power output from the DC-AC inverters 136 to the load 130 during the power outage condition ensures that the fuel cells 108 of each of the power modules 106 are uninterrupted during testing and characterization operations. Further, various modes of operation performed in the system 100 are explained in detail with reference to FIGS. 1A-1D, and therefore, they are not reiterated herein for the sake of brevity.

Figure 3:
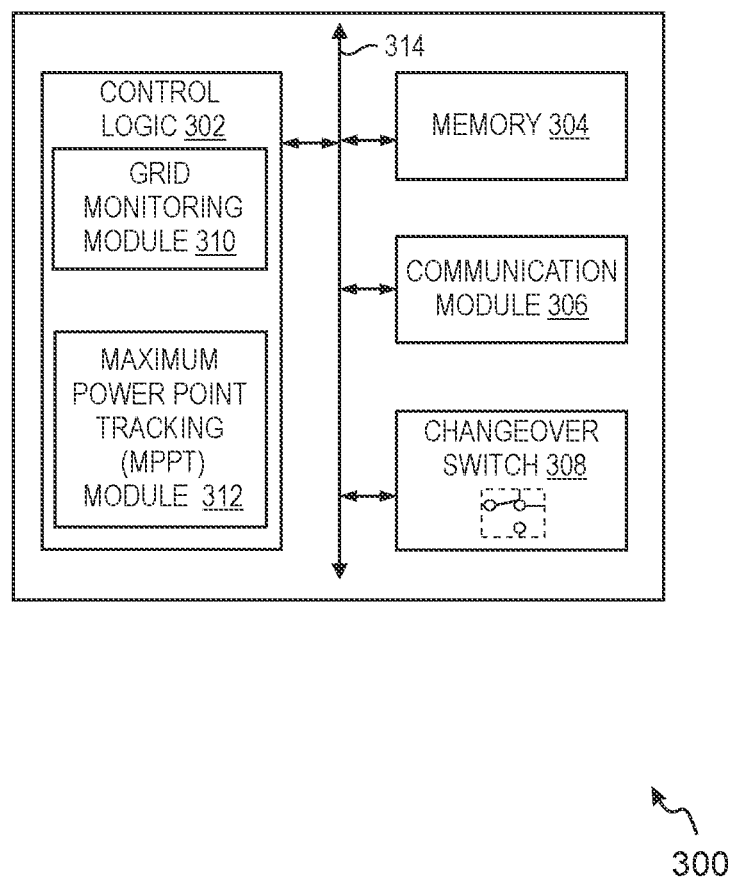
FIG. 3 is a simplified block diagram representation of a control unit for operating one or more components of a load management apparatus, in accordance with an embodiment of the present disclosure.

FIG. 3 is a simplified block diagram representation of a control unit 300 for operating one or more components of the load management apparatus 104, in accordance with an embodiment of the present disclosure. The control unit 300 is an example of the control unit 124 of FIGS. 1A-1D. The control unit 300 includes various processing modules (and/or control logic) for operating the one or more components of the load management apparatus 104. The processing modules (or the control logic) described herein may be implemented by a combination of hardware, software, and firmware components.

The control unit 300 includes a control logic 302 (i.e. processing module), a memory 304, a communication module 306, and a changeover switch 308. The control logic 302 includes a grid monitoring module 310 and a maximum power point tracking (MPPT) module 312. It is noted that although the control unit 300 is depicted to include only one control logic 302 (or the processing module), the control unit 300 may include more number of processors therein. Moreover, it shall be noted that the components are shown for exemplary purposes and the control unit 300 may include fewer or additional modules than those depicted in FIG. 3.

In an embodiment, the memory 304 is capable of storing machine-executable instructions. The memory 304 may be embodied as one or more volatile memory devices, one or more non-volatile memory devices, and/or a combination of one or more volatile memory devices and non-volatile memory devices. For example, the memory 304 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), and optical magnetic storage devices (e.g., magneto-optical disks). Further, the control logic 302 is capable of executing the machine-executable instructions to perform the functions described herein. More specifically, the instructions stored in the memory 304 are used by the control logic 302 for at least operating the DC-AC inverters 126 based at least on MPPT, and selectively operate the DC-AC inverters 126 and the DC-AC inverters 136 during grid events (such as power outage condition of the grid 128). Further, the control unit 300 may be configured to receive inputs from a master computer (not shown in figures) via the communication module 306. The control logic 302 embodies or is in communication with the components, such as the grid monitoring module 310 and the maximum power point tracking (MPPT) module 312.

In an embodiment, the control logic 302 may be embodied as a multi-core processor, a single-core processor, or a combination of one or more multi-core processors and one or more single-core processors. For example, the control logic 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. In an embodiment, the control logic 302 is embodied as an executor of software instructions, wherein the instructions may specifically configure the control logic 302 to perform the algorithms and/or operations described herein when the instructions are executed.

The various modules of the control unit 300, such as the control logic 302, the memory 304, the communication module 306, the changeover switch 308, the grid monitoring module 310, and the MPPT module 312 may be configured to communicate with each other through a centralized circuit system 314. The centralized circuit system 314 may be various devices configured to, among other things, provide or enable communication between the components (302 to 312) of the control unit 300. In certain embodiments, the centralized circuit system 314 may be software-based, a central printed circuit board (PCB) such as a motherboard, a mainboard, a system board, or a logic board. The centralized circuit system 314 may also, or alternatively, include other printed circuit assemblies (PCAs) or communication channel media. In an embodiment, the centralized circuit system 314 may constitute the low voltage circuits of the control unit 300. The low voltage circuits (i.e. the centralized circuit system 314) and the communication module 306 receive power supply from the power supply unit 140.

In an embodiment, the grid monitoring module 310 is configured to monitor the parameters associated with the grid 128. To that effect, the grid monitoring module 310 in conjunction with the control logic 302 determines the operating conditions of the grid 128 based at least on the parameters associated with the grid 128. The control logic 302 operates the changeover switch 308 in the first position for connecting the first set of DC-AC inverters 126 with the DC split bus 120, if the parameters determined by the grid monitoring module 310 are within the threshold limit. Thus, the first set of DC-AC inverters 126 is operated to convert the DC power output from the DC split bus 120 to AC power as per the power requirements of the grid 128. Additionally, the control logic 302 in conjunction with the grid monitoring module 310 determines the power outage condition of the grid 128 based on the parameters of the grid 128. In this scenario, the control logic 302 operates the changeover switch 308 in a second position for connecting the second set of DC-AC inverters 136 with the DC split bus 120. In this scenario, the control logic 302 operates the second set of DC-AC inverters 136 to convert the DC power output from the DC split bus 120 to AC power and transmit the AC power to the load 130. This allows uninterrupted (or continuous) operation of the fuel cells 108 of each of the power modules 106 during testing and characterization of the fuel cells 108.

In one embodiment, the MPPT module 312 is configured to determine a maximum power point (MPP) for operating the DC-AC inverters 126 at maximum efficiency. More specifically, the MPPT module 312 in conjunction with the control logic 302 constantly adjusts the resistance of the DC-AC inverters 126 in order to operate the DC-AC inverters 126 based at least on MPPT. As such, operating the DC-AC inverters 126 at MPPT results in transmitting the AC power from the DC-AC inverters 126 to the grid 128 at a substantially unity power factor, thus resulting in maximum power transmission efficiency from the power modules 106 to the grid 128. Additionally, the MPPT module 312 in conjunction with the control logic 302 may operate the second set of DC-AC inverters 136 based at least on MPPT in order to transmit the AC power from the second set of DC-AC inverters 136 to the load 130 at substantially unity power factor. Further, various operations performed by the control unit 300 to reduce wastage of energy and to maintain uninterrupted operation of the fuel cells 108 are explained in detail with references to FIGS. 1A-1D and FIG. 2. Therefore, they are not reiterated herein for the sake of brevity.

Figure 4:
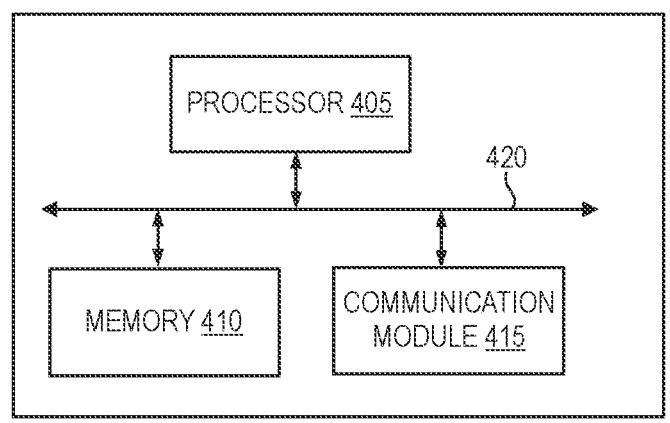
FIG. 4 is a simplified block diagram representation of a direct current-to-direct current (DC-DC) master controller for operating DC-DC converters associated with the load management apparatus, in accordance with an embodiment of the present disclosure.

FIG. 4 is a simplified block diagram representation of a DC-DC master controller 400 for operating the DC-DC converters 116 and 138 associated with the load management apparatus 104, in accordance with an embodiment of the present disclosure. The DC-DC master controller 400 is an example of the DC-DC master controller 122 of FIGS. 1A-1D. The DC-DC master controller 400 includes at least one processor 405, a memory 410, and a communication module 415. The one or more components of the DC-DC master controller 400 communicate with each other via a centralized circuitry 420. The components of the DC-DC master controller 400 provided herein may not be exhaustive, and the DC-DC master controller 400 may include more or fewer components than that depicted in FIG. 4.

The processor 405 is configured to extract programming instructions from the memory 410 to provide various features and/or perform various operations of the present disclosure. In one scenario, the processor 405 is configured to operate the second set of DC-DC converters 116 for boosting the voltage level of the DC power output of the centralized DC bus 114 based on the required DC output associated with the DC split bus 120. More specifically, the processor 405 is configured to operate the DC-DC converters 116 based at least on the input current control operation. In other words, the processor 405 controls the input current to each of the DC-DC converters 116. In another scenario, the processor 405 is configured to operate at least one DC-DC converter of the third set of DC-DC converters 138, if at least one DC-DC converter of the second set of DC-DC converters 116 attains a failure condition. Further, the processor 405 is configured to selectively operate the DC-DC converters 116 and 138 based at least on input current control operation in order to maintain the required DC output at the DC split bus 120. The processor 405 is configured to transmit command signals to the DC-DC converters 116 and 138 via the communication module 415 for operating the DC-DC converters 116 and 138.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:
    a set of power modules, each power module of the set of power modules comprising a plurality of fuel cells configured to generate direct current (DC) power;
    a first set of direct current-to-direct current (DC-DC) converters comprising an input terminal and an output terminal, wherein each DC-DC converter of the first set of DC-DC converters is electrically connected to a corresponding power module of the set of power modules at the input terminal;
    a centralized DC bus formed by an interconnection of the output terminal of each of the first set of DC-DC converters;
    a second set of DC-DC converters electrically connected to the centralized DC bus, the second set of DC-DC converters configured to provide an output DC power by boosting a voltage level of the DC power received from the set of power modules through the first set of DC-DC converters and the centralized DC bus;
    a first set of direct current-to-alternating current (DC-AC) inverters comprising a DC end and an AC end, wherein the first set of DC-AC inverters is electrically connected to the second set of DC-DC converters at the DC end, and the AC end is electrically connected to a grid; and
    a control unit communicably coupled to the first set of DC-AC inverters and the grid, the control unit configured to at least:
        operate the first set of DC-AC inverters to convert the DC power output from the second set of DC-DC converters to AC power, and
        facilitate transmission of the AC power output of the first set of DC-AC inverters to the grid based at least on determining one or more parameters associated with the grid are within a threshold limit, wherein the first set of DC-AC inverters enables transmission of the AC power to the grid at substantially unity power factor.

2. The system as claimed in claim 1, wherein the control unit is configured to operate the first set of DC-AC inverters based, at least in part, on maximum power point tracking (MPPT), and wherein the combined effect of switching modulation associated with the first set of DC-AC inverters, and operating the first set of DC-AC inverters based at least on MPPT enables transmission of the AC power output from the first set of DC-AC inverters to the grid at substantially unity power factor.

3. The system as claimed in claim 1, wherein the first set of DC-DC converters is operated for conditioning the DC power generated by the plurality of fuel cells based, at least in part, on input current control operation, and wherein the first set of DC-DC converters is configured to transmit the DC power output to the centralized DC bus upon conditioning.

4. The system as claimed in claim 1, wherein an output end of each DC-DC converter of the second set of DC-DC converters is electrically coupled to each other to form a DC split bus, and wherein the DC split bus is configured to receive the DC power output from the second set of DC-DC converters.

5. The system as claimed in claim 4, wherein the control unit is further configured to:
    determine a power outage condition of the grid based at least on monitoring the one or more parameters associated with the grid;
    operate a second set of DC-AC inverters to convert the DC power received from the second set of DC-DC converters through the DC split bus to AC power based at least on determining the power outage condition of the grid; and
    facilitate transmission of the AC power output from the second set of DC-AC inverters to a load.

6. The system as claimed in claim 5, wherein the control unit is further configured to:

operate a changeover switch to a second position from a first position for disconnecting the first set of DC-AC inverters from the DC split bus during power outage condition of the grid, wherein the changeover switch operated in the second position enables the electrical connection between the second set of DC-AC inverters and the DC split bus, thereby allowing the second set of DC-AC inverters to convert the DC power output from the DC split bus to AC power.

7. The system as claimed in claim 5, wherein transmitting the AC power output from the second set of DC-AC inverters to the load during the power outage condition of the grid ensures that the plurality of fuel cells of each of the set of power modules is uninterrupted during testing and characterization of the plurality of fuel cells associated with each power module of the set of power modules.

8. The system as claimed in claim 5, wherein the load is a resistive load.

9. The system as claimed in claim 1, wherein the one or more parameters associated with the grid include voltage amplitude, frequency, and phase angle.

10. The system as claimed in claim 1, further comprising:
a DC-DC master controller communicably coupled to the second set of DC-DC converters and a third set of DC-DC converters, the DC-DC master controller configured to at least:
operate selectively, the second set of DC-DC converters and the third set of DC-DC converters based, at least in part, on input current control operation.

11. The system as claimed in claim 10, wherein the DC-DC master controller is configured to selectively operate, at least one DC-DC converter of a third set of DC-DC converters along with the second set of DC-DC converters in order to maintain the required DC power output at the DC split bus,
wherein the at least one DC-DC converter of the third set of DC-DC converters is operated along with the second set of DC-DC converters based at least on determining a failure condition of at least one DC-DC converter of the second set of DC-DC converters.

12. The system as claimed in claim 1, further comprising:
at least one power supply unit configured to provide power supply to one or more communication modules and low voltage circuits associated with the system; and
an auxiliary power supply configured to provide power supply to the control unit and a DC-DC master controller during power outage condition of the grid.

* * * * *